(12) United States Patent
Husein et al.

(10) Patent No.: US 12,312,477 B2
(45) Date of Patent: May 27, 2025

(54) METHOD AND APPARATUS FOR PRODUCING CORE-SHELL CALCIUM HYDROXIDE-CALCIUM CARBONATE PARTICLES

(71) Applicant: Biosenta Inc., Toronto (CA)

(72) Inventors: Maen Husein, Calgary (CA); Noora Naif Darwish, Calgary (CA)

(73) Assignee: Blosenta Inc., Toronto (CA)

( * ) Notice: Subject to any disclaimer, the term of this patent is extended or adjusted under 35 U.S.C. 154(b) by 0 days.

(21) Appl. No.: 17/978,855

(22) Filed: Nov. 1, 2022

(65) Prior Publication Data

US 2023/0140807 A1 May 4, 2023

Related U.S. Application Data

(60) Provisional application No. 63/391,989, filed on Jul. 25, 2022, provisional application No. 63/274,995, filed on Nov. 3, 2021.

(51) Int. Cl.
*C09C 3/06* (2006.01)
*C09C 1/02* (2006.01)

(52) U.S. Cl.
CPC ............ *C09C 3/063* (2013.01); *C09C 1/02* (2013.01); *C01P 2004/80* (2013.01)

(58) Field of Classification Search
CPC .................. C09C 3/063; C09C 1/02
See application file for complete search history.

(56) References Cited

U.S. PATENT DOCUMENTS

| 9,493,658 | B2 * | 11/2016 | Martin | ............... | C08K 9/10 |
| 2004/0154770 | A1 * | 8/2004 | Doelle | ............... | D21H 17/70 |
| | | | | | 162/181.2 |
| 2005/0268786 | A1 | 12/2005 | Bras | | |
| 2011/0280777 | A1 * | 11/2011 | Maijala | ............... | C01F 11/181 |
| | | | | | 422/642 |

FOREIGN PATENT DOCUMENTS

| CA | 2445658 | A1 | | 11/2002 | | |
| CA | 2572776 | A1 | | 1/2006 | | |
| KR | 1020070048195 | | * | 5/2007 | | |
| TW | 548141 | B1 | * | 9/2016 | ......... | H04M 1/0254 |
| WO | WO2015123769 | A1 | | 8/2015 | | |

OTHER PUBLICATIONS

PCT International Search Report and Written Opinion from PCT/CA2022/051620 mailed on Jan. 11, 2023.

* cited by examiner

*Primary Examiner* — Tabatha L Penny (74) *Attorney, Agent, or Firm* — Forsgren Fisher McCalmont DeMarea Tysver LLP; James M. Urzedowski; Daniel A. Tysver (57) ABSTRACT

A method for preparing calcium carbonate ($CaCO_3$) coated calcium hydroxide ($Ca(OH)_2$) particles. The method includes introducing liquid carbon dioxide into a reaction vessel, introducing calcium hydroxide particles into the reaction vessel, and effectively mixing the calcium hydroxide particles into the liquid carbon dioxide. The method further includes inducing a phase change in the liquid carbon dioxide so as to coat the calcium hydroxide in dry ice. In a different embodiment, liquid carbon dioxide may be introduced into a throttle valve inducing a phase change into a mixture of a gaseous carbon dioxide and a solid dry ice, and calcium hydroxide particles can be introduced into an exit stream with said mixture, inducing heterogeneous nucleation of the dry ice. In addition, both embodiments include sublimating the dry ice after a predetermined residence time to control the thickness of the calcium carbonate coating on the calcium hydroxide particles.

10 Claims, 9 Drawing Sheets

METHOD AND APPARATUS FOR PRODUCING CORE-SHELL CALCIUM HYDROXIDE-CALCIUM CARBONATE PARTICLES

FIELD OF INVENTION

This present disclosure relates to the production of fillers, and more specifically, the production of core-shell calcium hydroxide-calcium carbonate particles.

BACKGROUND OF THE INVENTION

The use of fillers in polymer compositions, paints, and coatings is well known and established in literature. Fillers usually impart enhanced properties to the final product, including mechanical, optical, physical as well as fire retardancy properties. U.S. Pat. Nos. 9,493,658 and 6,310,129 provide suitable techniques for the use of fillers. Different commercial inorganic powdered fillers such as calcium carbonates, talcs, clays, gypsum, barytes, feldspar and silicates are currently widely in use. Nevertheless, the application of ground mineral fillers is limited by their relatively large sizes, as indicated in U.S. Pat. No. 6,310,129. Thus, micro-size fillers are usually synthesized chemically, which makes them much more costly.

Synthetic $Ca(OH)_2$ filler in polyvinyl chloride (PVC) neutralizes the toxic chlorine gas produced in the event of PVC combustion. The fire retardancy of $Ca(OH)_2$, on the other hand, is questionable, since $Ca(OH)_2$ reacts exothermically at relatively low temperature with $CO_2$ in presence of air yielding $CaCO_3$, rather than decomposing endothermically to its oxide upon heating in the presence of air as indicated in U.S. Pat. No. 6,310,129. However, $Ca(OH)_2$ additive slowly reacts with atmospheric $CO_2$ to yield $CaCO_3$, which may limit functionality of $Ca(OH)_2$. Nevertheless, commercial $Ca(OH)_2$ is still used as an additive for different thermosetting resins to improve the tracking resistance of electrical/optical instruments, as indicated by U.S. Pat. Nos. 9,493,658, 6,310,129 and 7,883,681.

Carbide lime coproduced during acetylene manufacturing consists of 70-85% wt/wt $Ca(OH)_2$ and 5-25% wt/wt $CaCO_3$ in the form of shell onto the $Ca(OH)_2$ grains as indicated in U.S. Pat. No. 7,883,681. Carbide lime has been found an effective filler in many products owing to its multifold properties. Carbide lime is used for waste acid neutralization, gas scrubbing and desulphurization, pH control in sewage and water treatment plants, production of building blocks and paving material, dehalogenation as well as the manufacturing of calcium magnesium acetate and calcium hypochlorite. These uses for carbide lime are indicated in U.S. Pat. Nos. 6,310,129 and 5,997,883 and F. A. Cardoso et al. "Carbide lime and industrial hydrated lime characterization", Powder Technol., 2009, doi: 10.1016/j.powtec.2009.05.017. Carbide lime is also an effective antibacterial, anti-viral, and anti-fungal agent as described in U.S. Pat. Nos. 6,310,129 and 7,883,681. Carbide lime is ground and screened to collect particles of desired sizes for a given application.

However, the use of carbide lime is limited by its greyish color due to the coke used during the acetylene gas production. Thus, all resin molded products utilizing the processed raw carbide lime have dark colors as taught in U.S. Pat. No. 7,883,681. Therefore, synthetic core-shell $Ca(OH)_2$— $CaCO_3$ particles (also referred to herein as calcium carbonate-coated calcium hydroxide particles) have been prepared.

One method of preparing the calcium carbonate-coated calcium hydroxide particles is through blowing $CO_2$-containing gas, e.g., flue gas, into a bed containing $Ca(OH)_2$ particles as described by Meade in U.S. Pat. No. 7,883,681. In addition, exposure time helps controlling the thickness of the $CaCO_3$ coating, however, the process is poorly reproducible, mainly due to particle collision. Collision deteriorates part of the coating, blocks particles from reacting, and contributes to major particle aggregation as shown in U.S. Pat. No. 7,883,681. To overcome this limitation, U.S. Pat. No. 9,493,658 teaches the preparation of calcium carbonate-coated calcium hydroxide particles upon reacting finely ground commercial $Ca(OH)_2$ particles with dry ice. In one design, $Ca(OH)_2$ particles and dry ice are added to a silo from two separate ports. Mixing between the reactants is enabled by gravity settling of the particles in sublimating dry ice. Another design allows for a very brief mixing of the reactants in a Hobart mixer prior to introducing the reactants to the silo from a single port. This approach addressed the limitations reported previously and was successful in producing a more consistent and even particles having 70-95 wt % $Ca(OH)_2$ and 5-30 wt % $CaCO_3$ surface coating as shown in U.S. Pat. No. 9,493,658.

However, it is noted that gravity settling within the silo may not be ideal to control the thickness of the $CaCO_3$ coating. While residence time depends on the height of the silo and $Ca(OH)_2$ particle size as indicated in H. Scott Fogler, "Elements of chemical reaction engineering" Chem. Eng. Sci., 1987, doi: 10.1016/0009-2509(87)80130-.6, less control over the calcium carbonate-coated calcium hydroxide particle size distribution is achieved within a silo. Moreover, the calcium carbonate-coated calcium hydroxide particle size is mainly controlled through selecting the size of the $Ca(OH)_2$ reactant particles. For example, reacting ~44 μm $Ca(OH)_2$ particles with dry ice having a mesh size of minus 12-plus 18 in the form of flakes produces calcium carbonate-coated calcium hydroxide particles of 0.1-75 μm. For a given silo, the mass ratio of the reactants is used to control the calcium carbonate-coated calcium hydroxide product specifications as indicated in U.S. Pat. No. 9,493,658. Lastly, mixing of the solid reactants prior to introducing the reactants to the silo may lead to $Ca(OH)_2$ particle aggregation, especially given the particle small size and the corresponding surface energy, as taught in M. Husein, "Preparation of nanoscale organosols and hydrosols via the phase transfer route", Journal of Nanoparticle Research. 2017, doi: 10.1007/s11051-017-4095-0.

Modeled after carbide lime, the calcium carbonate-coated calcium hydroxide particles produced from reacting $Ca(OH)_2$ with dry ice also have proven antibacterial, antifungal, and antiviral attributes as well as significant pH adjustment property as indicated in U.S. Pat. No. 9,493,658. These attributes make these synthetic calcium carbonate-coated calcium hydroxide particles an ideal filler for different commercial products. Preliminary testing in the Southwest Research Institute, "Final Report of Southwest Research Institute (SwRI) Project 20637 (Proposal No. 01-72445) "Mold Resistance Efficacy Testing of Paint with ZeroMold Additive," 2015 and Southwest Research Institute, "Laboratory Testing Results," 2014 showed that resin-molded products and paints mixed with calcium carbonate-coated calcium hydroxide particles impart significant sterilizing properties, including bactericidal, fungicidal, and virucidal attributes. These antimicrobial attributes are induced by the high $Ca(OH)_2$ content and is expected to last for up to a hundred years, per the accelerated aging testing as is indicated in U.S. Pat. No. 9,493,658.

In addition, in Vance et al. (2015) 'Direct Carbonation of $Ca(OH)_{(2)}$ Using Liquid and Supercritical $CO_2$: Implications for Carbon-Neutral Cementation', Industrial & engineering chemistry research, 54(36), pp. 8908-8918. doi: 10.1021/acs.iecr.5b02356, the carbonation of $Ca(OH)_2$ upon placing in liquid $CO_2$ was investigated. An isothermal process to vent out the liquid $CO_2$ was used. Analysis of the reaction kinetics showed that $Ca(OH)_2$ reaction in liquid $CO_2$ is rapid (~80% conversion in 2 h). This suggests that the product $CaCO_3$ layer is non-passivating. The pressure and temperature had little effect on the carbonation rate. Furthermore, scanning electron microscope (SEM) images for the carbonated $Ca(OH)_2$ have indicated the formation of calcite layers on the surfaces of $Ca(OH)_2$ grains. Irregular growth, nonuniform morphological structure, and exfoliation of the initially formed $CaCO_3$ surface layers (terracing effect) are the main reasons behind the non-passivating calcite layer formed on top of $Ca(OH)_2$. The materials produced using the procedure of Vance et al. were tested for biocidal activity and the results showed low effective biocidal activity. This was due to the high extent of particle agglomeration as well as inconsistent $CaCO_3$ film. The drawbacks in morphology contributed to less effective biocidal particles.

Furthermore, according to Dheilly, R. M, J Tudo, Y Sebaïbi, and M Quéneudec. "Influence of Storage Conditions on the Carbonation of Powdered $Ca(OH)_2$." Construction & building materials 16, no. 3 (2002): 155-161, a drawback of the reaction of $Ca(OH)_2$ with gaseous $CO_2$ is that it occurs slowly at the temperatures associated with the throttling process, especially in absence of moisture.

SUMMARY OF THE INVENTION

According to various aspects to the present invention, there is provided a method for preparing calcium carbonate $(CaCO_3)$-coated calcium hydroxide $(Ca(OH)_2)$ particles. The method includes introducing liquid carbon dioxide into a reaction vessel, introducing calcium hydroxide particles into the reaction vessel, and effectively mixing the calcium hydroxide particles into the liquid carbon dioxide. The method further includes inducing a phase change in the liquid carbon dioxide so as to coat the calcium hydroxide in dry ice. In addition, the method includes sublimating the dry ice after a predetermined residence time to control the thickness of the calcium carbonate coating on the calcium hydroxide particles.

The method may include the liquid carbon dioxide being introduced into the reaction vessel at a pressure of 8 MPa and a temperature of −25° C.

Alternatively, the method may include the liquid carbon dioxide being introduced into the reaction vessel at a pressure range of 0.518 MPa to 16 MPa and a temperature range of −56.56° C. to 30.98° C.

The introduction of calcium hydroxide particles into the reaction vessel may include feeding the calcium hydroxide particles into an auxiliary chamber, flushing the calcium hydroxide particles in the auxiliary chamber with the liquid carbon dioxide and introducing the mixture into the reaction vessel to be further mixed with the already present liquid carbon dioxide.

Alternatively, the calcium hydroxide particles may be introduced into the reaction vessel prior to the liquid carbon dioxide being introduced into the reaction vessel.

The method may include a high-pressure reactor as the reaction vessel, the high-pressure reactor including a stirrer for mixing.

Alternatively, the method may include an inline mixer as the reaction vessel.

Inducing the phase change in the liquid carbon dioxide may be performed using a throttle valve to flash the liquid carbon dioxide into dry ice.

The throttle valve may flash at a pressure of 0.1 MPa to create dry ice.

Alternatively, the throttle valve may flash at a pressure range of 0.01 MPa to 0.518 MPa and a temperature lower than −56.56° C.

Controlling the thickness of the calcium carbonate coating on the calcium hydroxide particles occurs over the predetermined residence time in a separator vessel at a pressure of less than or equal to 0.518 MPa.

The method may further include collecting gaseous carbon dioxide from the sublimation of the dry ice and inducing a phase change in the gaseous carbon dioxide to provide liquid carbon dioxide to be introduced into the reaction vessel.

According to various aspects to the present invention, there is provided a system for producing calcium carbonate $(CaCO_3)$-coated calcium hydroxide $(Ca(OH)_2)$ particles. The system includes a reaction vessel for receiving liquid carbon dioxide and calcium hydroxide particles. The system further includes a stirrer to effectively mix the liquid carbon dioxide and calcium hydroxide particles, and a throttle valve for inducing a phase change to liquid carbon dioxide to coat the calcium hydroxide particles in dry ice. In addition, the system includes a separator vessel for sublimating the dry ice after a predetermined residence time to control the thickness of the calcium carbonate coating on the calcium hydroxide particles.

The system may include the liquid carbon dioxide being received by the reaction vessel at a pressure of 8 MPa and a temperature of −25° C.

Alternatively, the system may include the liquid carbon dioxide being received by the reaction vessel at a pressure range of 0.518 MPa to 16 MPa and a temperature range of −56.56° C. to 30.98° C.

The calcium hydroxide particles may be received by the reaction vessel through flushing the calcium hydroxide particles in an auxiliary chamber with the liquid carbon dioxide and introducing the mixture into the reaction vessel to be mixed with the already present liquid carbon dioxide.

Alternatively, the calcium hydroxide particles may be received by the reaction vessel prior to the liquid carbon dioxide being received by the reaction vessel.

Alternatively, the liquid carbon dioxide is received by the reaction vessel prior to the calcium hydroxide particles being received by the reaction vessel.

The system may include a high-pressure reactor as the reaction vessel and the high-pressure reactor including a stirrer for mixing.

Alternatively, the system may include an inline mixer as the reaction vessel.

The throttle valve of the system may induce a phase change by flashing the liquid carbon dioxide at a pressure range of 0.01 MPa to 0.518 MPa and a temperature lower than −56.56° C.

Alternatively, the throttle valve of the system may induce the phase change by flashing the liquid carbon dioxide to a pressure of 0.1 MPa.

Controlling the thickness of the calcium carbonate coating on the calcium hydroxide particles occurs over the predetermined residence time in a separator vessel at a pressure of less than or equal to 0.518 MPa.

The system may further include a gaseous carbon dioxide outlet connected to the separator vessel, where the gaseous carbon dioxide outlet collects gaseous carbon dioxide from the sublimation of the dry ice in the separator vessel. The system may also include a return line with an in-line pressurization system connecting the gaseous carbon dioxide outlet and the reaction vessel, where the return line with the in-line pressurization system may be configured to induce a phase change to the gaseous carbon dioxide to provide liquid carbon dioxide to be introduced into the reaction vessel.

BRIEF DESCRIPTION OF THE SEVERAL VIEWS OF THE DRAWINGS

The embodiments of the present invention shall be more clearly understood with reference to the following detailed description of the embodiments of the invention taken in conjunction with the accompanying drawings, in which:

FIG. 7 depicts a phase diagram of carbon dioxide ($CO_2$) showing the regions of thermodynamically stable state(s) of $CO_2$ (i.e. solid, liquid and vapor states) at different values of pressure (psia) and specific enthalpy H (Btu/$lb_m$), where pressure is provided along the Y-axis on the left side of the phase diagram, specific volume v (ft$^3$/$lb_m$) is provided along the Y-axis on the right side of the phase diagram and specific enthalpy is provided along the X-axis of the phase diagram and other thermodynamic properties corresponding to given values of pressure and specific enthalpy, specific entropy S (Btu/($lb_m$) (R)), temperature (° F.) and $\chi$, weight fraction vapor, are also shown. The reference state is saturated liquid $CO_2$ at −40° F., where specific enthalpy H=0 and specific entropy S=0

DESCRIPTION OF THE PREFERRED EMBODIMENTS OF THE INVENTION

The description, which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

By way of general overview, there is provided a method for preparing calcium carbonate-coated calcium hydroxide particles in accordance with a preferred embodiment of the invention. The method generally involves dispersing calcium hydroxide ($Ca(OH)_2$) particles in liquid carbon dioxide ($CO_2$) and then flashing/throttling the particles to induce a phase change in the liquid carbon dioxide so it becomes dry ice. The resultant dry ice entraps the $Ca(OH)_2$ particles within its solid structure achieving enhanced coating of the particles with dry ice.

Figure 2:
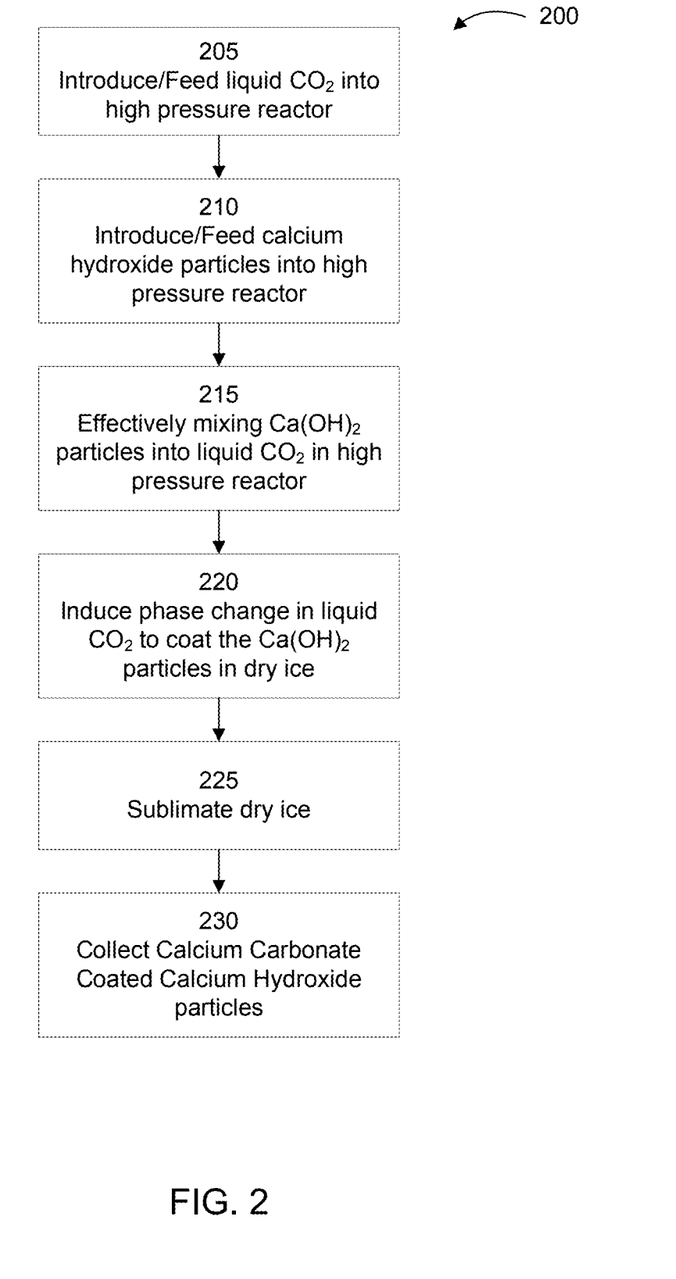
FIG. 2 depicts a method of producing calcium carbonate-coated calcium hydroxide particles in accordance with a first production line of the example system in FIG. 1.

In contrast to existing methods, method 200 is advantageous in that it allows improved carbonation and enhanced control over the level of carbonation of the particles. This is achieved through solid-liquid mixing, which tends to achieve a more thorough mixing than solid-solid mixing. Major carbonation reaction, however, proceeds between the dry ice and the entrapped $Ca(OH)_2$ particles, thereby allowing for more uniform coating of the particles. In this method, carbonation proceeds at the same rate in all directions, including the radial direction. As discussed below, the thickness of the $CaCO_3$ shell can be controlled by selectively reducing or increasing the residence time during which the carbon dioxide remains as a dry ice coating on the calcium hydroxide core, prior to sublimating the dry ice. This, in turn, permits better customization of the structural properties of the resultant calcium carbonate-coated calcium hydroxide particles such that the particles can be used in a wider range of products or have a wider range of applications, such as use in fillers for plastics, papers, cement and drywall. In addition, the resultant calcium carbonate-coated calcium hydroxide particles also have a higher biocidal activity, leading to an increased number of uses, especially in environments where a biocidal effect is advantageous. Method 200 further differs from existing production methods in that phase changes are induced in the carbon dioxide from liquid phase to solid and gas phases, as opposed to existing methods where the carbon dioxide changes from the solid phase to the gas phase. In addition, method 200 is advantageous over existing production methods in that it has a significantly faster production time.

Figure 1:
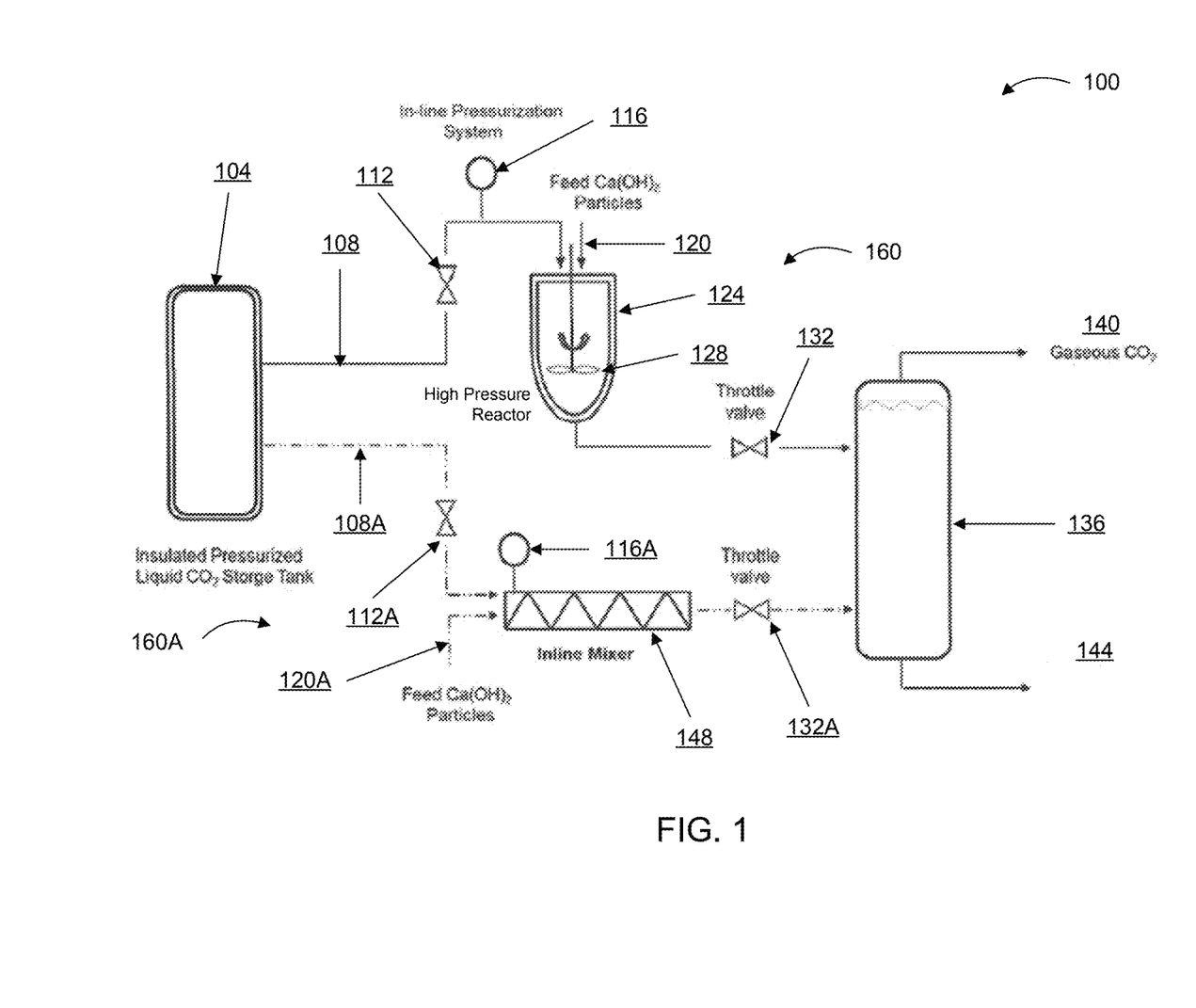
FIG. 1 depicts a system for producing calcium carbonate-coated calcium hydroxide entrapped into dry ice in accordance with an embodiment of the invention.

FIG. 1 depicts a system 100 for producing calcium carbonate-coated calcium hydroxide particles having two production lines 160 and 160A. The first production line 160 is depicted above the dotted line in system 100 and the second production line 160A is depicted below the dotted line in system 100. The first production line 160 and the second production line 160A may run in parallel and share certain components that will be discussed further below.

The first production line 160 includes an insulated pressurized liquid $CO_2$ storage tank 104 (hereinafter referred to as storage tank 104) connected to an insulated high pressure reactor 124 through a $CO_2$ feed line 108, allowing liquid $CO_2$ to be sent from storage tank 104 to high pressure reactor 124. Gate valve 112 and in-line pressurization system 116 may be positioned along $CO_2$ feed line 108. In addition to receiving liquid $CO_2$ from $CO_2$ feed line, high pressure reactor 124 also receives $Ca(OH)_2$ particles from $Ca(OH)_2$ feed line. High pressure reactor 124 includes stirrer 128 for mixing the liquid $CO_2$ and the $Ca(OH)_2$ particles. High pressure reactor 124 is connected to separator vessel 136 via throttle valve 132, where throttle valve 132 flashes the liquid $CO_2$ surrounding the $Ca(OH)_2$ particles and separator vessel 136 receives the resultant dry ice. The dry ice then sublimates in separator vessel 136 where the produced gaseous $CO_2$ is discharged through the connected gaseous $CO_2$ outlet 140 and the produced calcium carbonate coated hydroxide particles are discharged via the connected calcium carbonate coated calcium hydroxide product particle outlet 144.

Insulated pressurized liquid $CO_2$ storage tank 104 stores liquid $CO_2$, and is readily available through commercial means. Storage tank 104 may be of any size, and in this current embodiment may be the standardized 50 tonne storage tank that is typically supplied by tanker trucks. Typically, the storage tank 104 installation and associated piping and controls is part of vendor's supply and service agreement.

Liquid $CO_2$ feed line 108 leads from storage tank 104 to high pressure reactor 124, allowing liquid $CO_2$ to be sent from storage tank 104 to high pressure reactor 124 (also known as a reaction vessel), where it is received by high pressure reactor 124 through a leak-proof port. In the current embodiment, $CO_2$ feed line 108 includes going through gate valve 112, and in-line pressurization system 116. Gate valve 112 allows control of the flow of liquid $CO_2$ from storage tank 104 to high pressure reactor 124, and further allows the flow of liquid $CO_2$ to be safely shut off. In the current embodiment, gate valve 112 is used, however in alternate embodiments, a ball valve may be used for the same function. A person skilled in the art will recognize that different valve types may be used to control the flow of liquid $CO_2$ and for the safe shut off of the flow of liquid $CO_2$. In-line pressurization system 116 maintains the pressure within $CO_2$ feed line 108 to ensure that the $CO_2$ remains in a liquid state. While not necessary in the current embodiment, as the liquid $CO_2$ is already in the liquid state to be introduced into high-pressure reactor 124, in-line pressurization system 116 may also change the pressure, while maintaining lower temperature than the critical temperature, if storage tank 104 holds $CO_2$ in a different state, such as gaseous $CO_2$, inducing a phase change from gaseous $CO_2$ to liquid $CO_2$. It will occur to a person skilled in the art that gate valve 112 and in-line pressurization system 116 are optional, and that storage tank 104 may send liquid $CO_2$ to high-pressure reactor 124 without the need for gate valve 112 or in-line pressurization system 116. In other embodiments, first production line 160 may include gate valve 112 and lack an in-line pressurization system 116 or alternatively, production line 160 may include in-line pressurization system 116 and lack gate valve 112.

$Ca(OH)_2$ feed line 120 allows $Ca(OH)_2$ particles to be dispersed into high-pressure reactor 124. High-pressure reactor 124 includes stirrer 128, allowing the $Ca(OH)_2$ particles to be further mixed with the liquid $CO_2$ to ensure that the $Ca(OH)_2$ particles are thoroughly distributed and coated with the liquid $CO_2$.

The resulting mixture can then be sent through throttle valve 132 into separator vessel 136. The resulting mixture goes through a phase change while it passes through throttle valve 132, resulting in dry ice particles containing calcium hydroxide particles.

The second production line 160A is similar in layout to the first production line 160 but uses an inline mixer 148 in place a of high-pressure reactor 124. The second production line 160A includes storage tank 104 connected to inline mixer 148 via a $CO_2$ feed line 108A. Gate valve 112A and in-line pressurization system 116A are positioned along $CO_2$ feed line 108A. Inline mixer 148 receives liquid $CO_2$ from $CO_2$ feed line 108A, and further receives $Ca(OH)_2$ from $Ca(OH)_2$ feed line 120A. The liquid $CO_2$ and $Ca(OH)_2$ are mixed in inline mixer 148 and sent through throttle valve 132A. Throttle valve 132A flashes the liquid $CO_2$ surrounding the $Ca(OH)_2$ particles into dry ice, where it is received by separator vessel 136. The dry ice sublimates, and the resulting products of gaseous $CO_2$ and calcium carbonate coated calcium hydroxide particles are discharged through their respective outlets, gaseous $CO_2$ outlet 140, and calcium carbonate coated calcium hydroxide product particle outlet 144.

$CO_2$ feed line 108A leads from storage tank 104 to inline mixer 148, allowing liquid $CO_2$ to be sent from storage tank 104 to inline mixer 148. $CO_2$ feed line 108A includes going through gate valve 112A, and in-line pressurization system 116A. Similar to gate valve 112 of first production line 160, gate valve 112A of second production line 160A allows control of the flow of liquid $CO_2$ from the storage tank 104, and further allows the flow of liquid $CO_2$ to be safely shut off. Similar to in-line pressurization system 116 of first production line 160, in-line pressurization system 116A of second production line 160A maintains the pressure within $CO_2$ feed line 108A to ensure the $CO_2$ remains in a liquid state. Similar to first production line 160, gate valve 112A and in-line pressurization system 116A are optional. Liquid $CO_2$ is received into inline mixer 148 through a leak-proof port.

$Ca(OH)_2$ particles may be dispersed into inline mixer 148 through $Ca(OH)_2$ feed line 120A, where the $Ca(OH)_2$ particles may be further mixed with liquid $CO_2$ to ensure that the $Ca(OH)_2$ particles are thoroughly dispersed into liquid $CO_2$. Inline mixer 148 may also have a stirrer to further promote the dispersion of the $Ca(OH)_2$ particles. The resulting mixture can then be sent through throttle valve 132A where dry ice is formed. The dry ice is then fed into separator vessel 136.

Separator vessel 136 allows the dry ice to settle and allows gaseous $CO_2$ to leave without carrying particles with it. In both the first production line 160 and second production line 160A, separator vessel 136 may include a filter to aid in separating gaseous $CO_2$ and calcium carbonate coated calcium hydroxide product particles. The filter (also known as a mist eliminator) captures dust or particles that are leaving with the $CO_2$ vapors. The mist eliminator is also generally used in evaporators and is known to persons skilled in the art. Furthermore, separator vessel 136 may include a pressure control module to change and maintain pressure within separator vessel 136, and a heating element to accelerate dry ice sublimation if needed.

Once the dry ice has been sublimated, the resultant products of gaseous $CO_2$ and calcium carbonate-coated calcium hydroxide products may be collected through gaseous $CO_2$ outlet 140 and calcium carbonate-coated calcium hydroxide product particle outlet 144 respectively.

Figure 8:
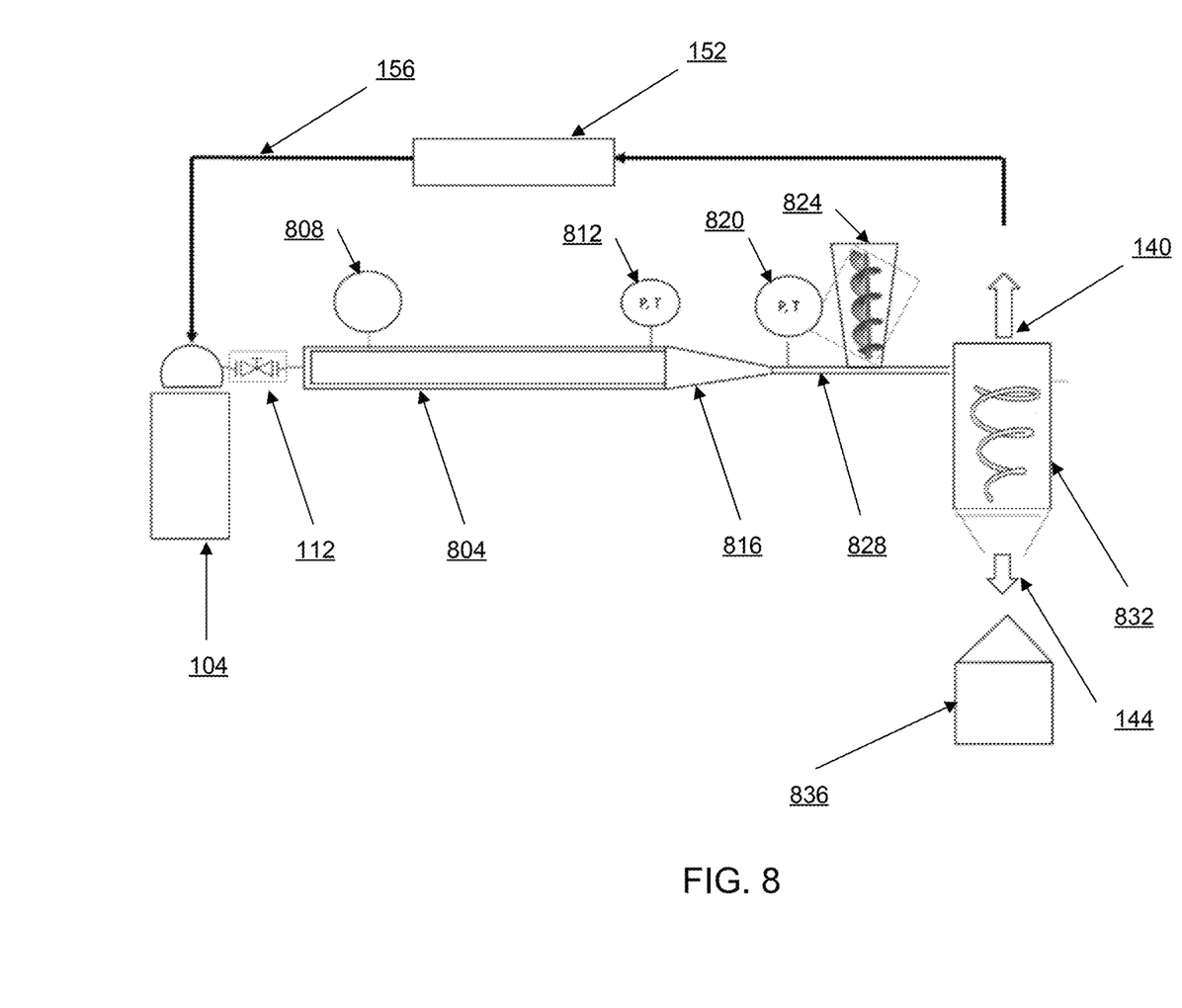
FIG. 8 depicts a system for producing calcium carbonate-coated calcium hydroxide particles in accordance with yet another embodiment of the invention, where the calcium hydroxide particles induce heterogeneous nucleation of dry ice in an exit stream of the throttling valve.

In alternate embodiments, separator vessel 136 may be substituted with cyclone 832, where centrifugal forces and cyclonic separation allow the separation of the calcium carbonate coated calcium hydroxide product particles and the gaseous $CO_2$. Cyclone 832 will be further discussed below.

Figure 4:
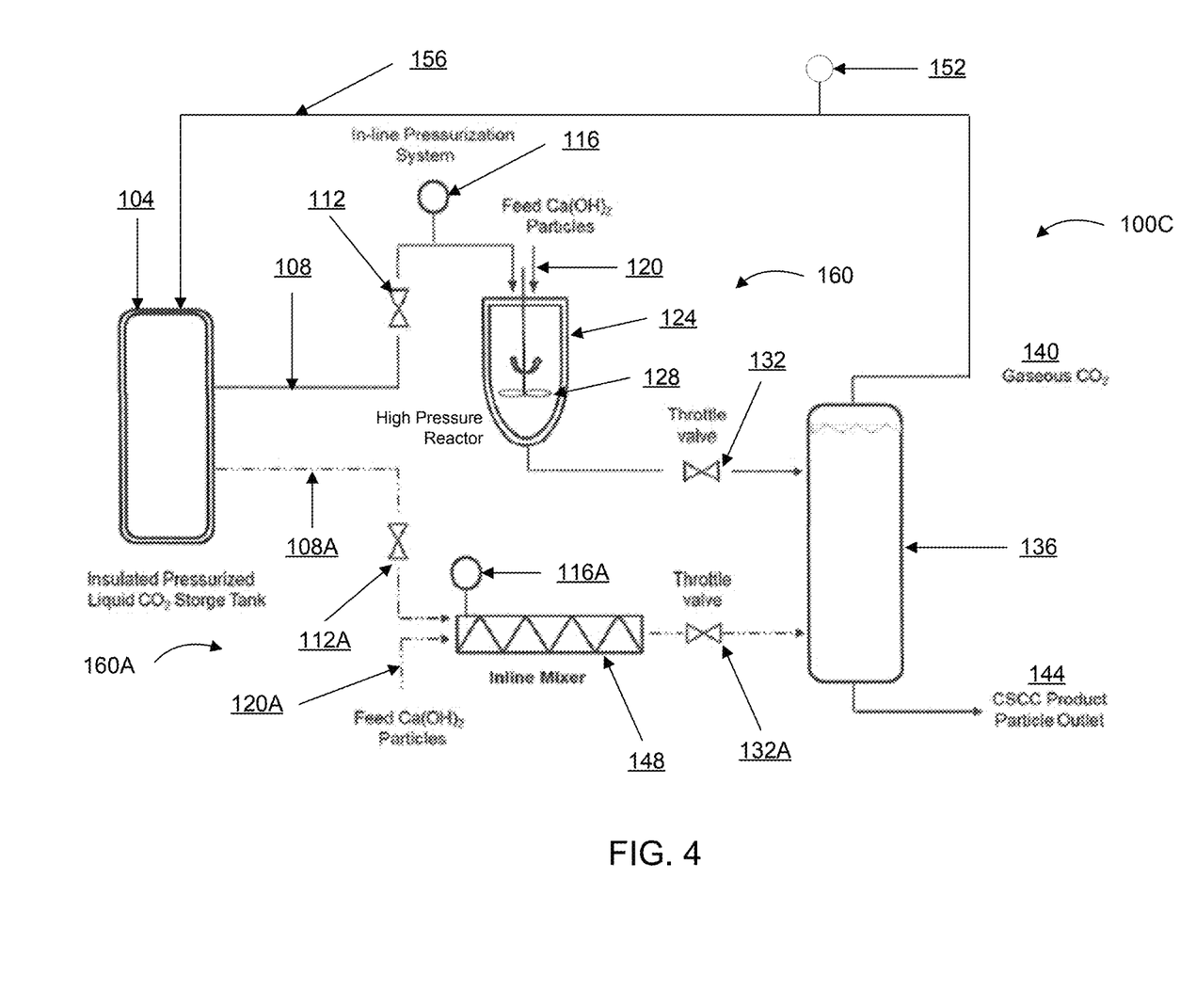
FIG. 4 depicts a system for producing calcium carbonate-coated calcium hydroxide in accordance with another embodiment of the invention, where the end product gaseous $CO_2$ is recirculated into the system for further use as liquid $CO_2$

In another embodiment, system 100C depicts the same two production lines 160 and 160A, however, gaseous $CO_2$ from gaseous $CO_2$ outlet 140 is returned to the storage tank 104 via return line 156, after going through in-line pressurization system 152. In-line pressurization system 152 raises the pressure within return line 156 to induce a phase change in the $CO_2$, converting the gaseous $CO_2$ into liquid $CO_2$. It will occur to a person skilled in the art that in-line pressurization system 152 may be any component that induces a phase change in the $CO_2$.

Returning to FIG. 1, while system 100 depicts the two production lines 160 and 160A for producing calcium carbonate-coated calcium hydroxide, it will occur to a person skilled in the art that the two production lines 160 and 160A are not limited to running in parallel and may in fact run independently.

FIG. 2 depicts method 200 for producing calcium carbonate coated calcium hydroxide particles using first production line 160.

In the first production line 160, block 205 depicts introducing liquid $CO_2$ into high-pressure reactor 124 from storage tank 104 via $CO_2$ feed line 108. Block 210 depicts feeding $Ca(OH)_2$ particles into high-pressure reactor 124 via $Ca(OH)_2$ feed line 120.

In the current embodiment of method 200, liquid $CO_2$ is received first by high-pressure reactor 124, and then $Ca(OH)_2$ particles are then dispersed into high-pressure reactor 124. In other embodiments, it is contemplated that $Ca(OH)_2$ particles could be fed into the high-pressure reactor before the liquid $CO_2$. In another embodiment, it is contemplated that $Ca(OH)_2$ particles are placed into a small chamber or an auxiliary chamber, and then flushed with a small amount of liquid $CO_2$, prior to being moved into high-pressure reactor 124 to be further mixed with additional liquid $CO_2$. The $Ca(OH)_2$ particles can be flushed with a small amount of liquid $CO_2$ into a nozzle which directs the mixture into an opposing nozzle ejecting liquid $CO_2$. The spray from either nozzle is designed to overlap with one another, to further promote dispersion.

Once both liquid $CO_2$ and $Ca(OH)_2$ particles are received, they may be mixed/dispersed in high-pressure reactor 124 using stirrer 128. This is depicted in block 215. Throughout the steps in blocks 205 to 215, the liquid $CO_2$ (1) may be kept at a range of 0.518 MPa to 16 MPa and $-56.56°$ C. to $30.98°$ C. In a preferred embodiment, the liquid $CO_2$ is kept at 8 MPa and $-25°$ C., as this is easily achieved, and is readily used in industry. The dispersion of the $Ca(OH)_2$ particles in liquid $CO_2$ is to ensure a thorough and uniform coating of liquid $CO_2$ surrounding the $Ca(OH)_2$ particles.

At block 220, the liquid $CO_2$ and $Ca(OH)_2$ particle mixture is then sent through a throttle valve 132. The liquid $CO_2$ undergoes a phase change from liquid into a solid, creating a dry ice shell surrounding the $Ca(OH)_2$ particles.

Figure 6:
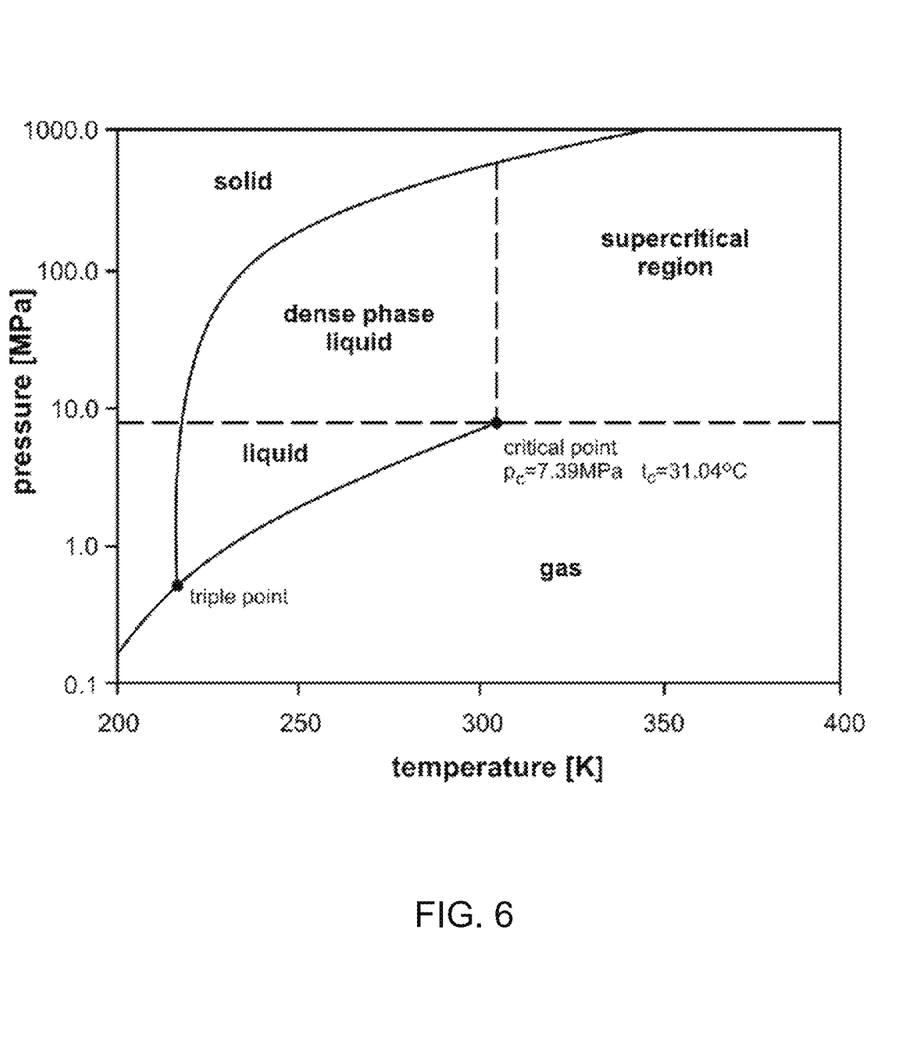
FIG. 6 depicts a phase diagram of carbon dioxide ($CO_2$) showing the stability fields of the solid, liquid and vapor states.
Figure 7:
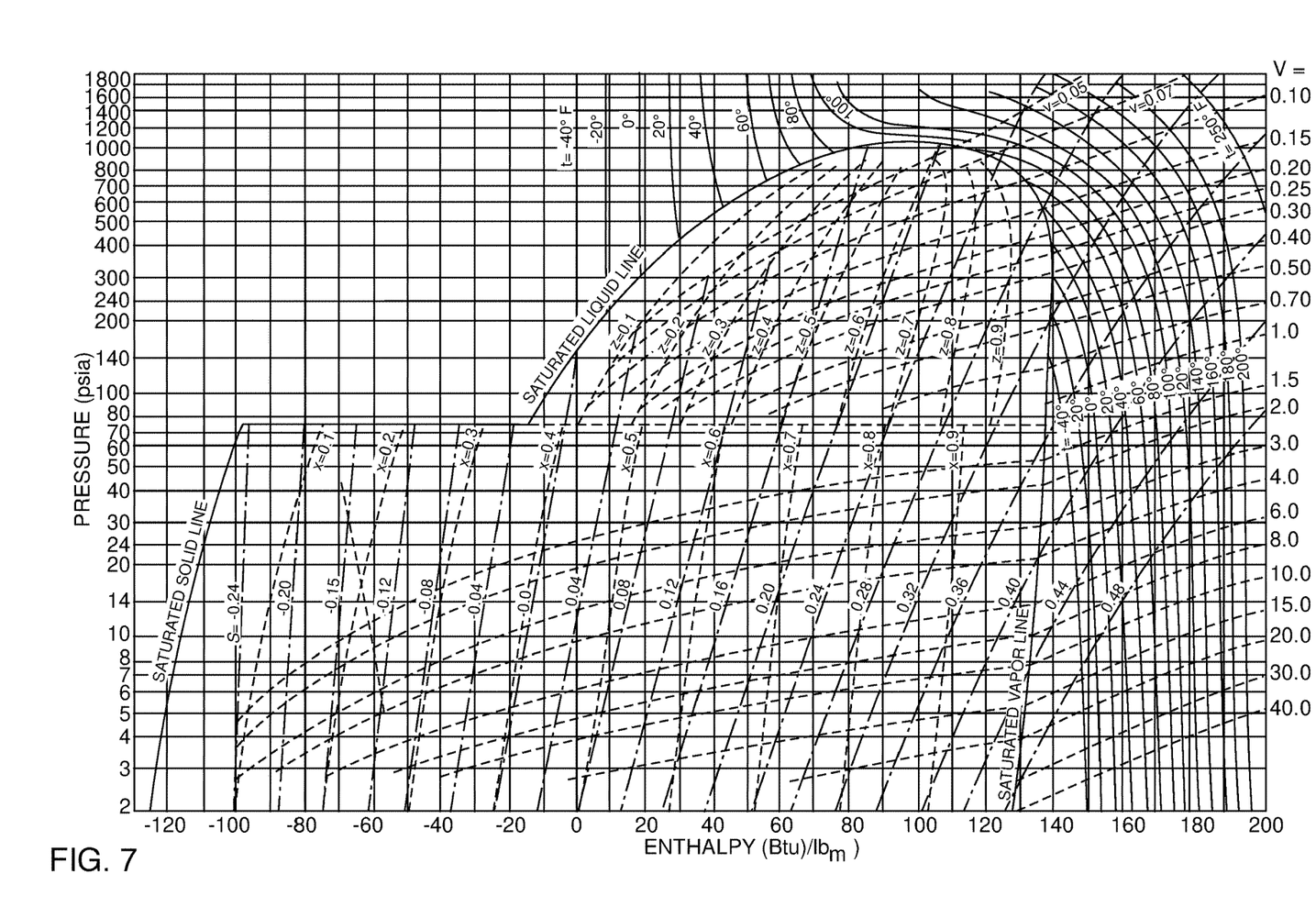

In the current embodiment, the liquid $CO_2$ and $Ca(OH)_2$ mixture is sent through throttle valve 132, and the liquid $CO_2$ is flashed into dry ice at preferred normal atmospheric pressure of 0.1 MPa creating a dry ice shell surrounding the $Ca(OH)_2$ particle. Alternatively, the dry ice shell may also be formed through throttle valve 132 at different temperatures and pressures by undergoing a phase change. FIG. 6 is a pressure-temperature phase diagram that depicts other conditions at which liquid $CO_2$ and dry ice can be obtained. FIG. 7 is a pressure-enthalpy phase diagram depicting conditions at which dry ice can be formed from liquid $CO_2$ through an isenthalpic process. FIG. 6 can be found at "$CO_2$ as a Refrigerant—Properties of R744" by Andre Patenaude published on May 14, 2015, located at the following URL: "https://emersonclimateconversations.com/2015/05/14/co2-as-a-refrigerant-properties-of-r744/". The data for FIG. 7 can be found in Plank, R., and Kuprianoff, J., Z. ges. Kalte-Ind., 1.1 (1929); Z. tech. Physik, 10, 99 (1929). It will occur to a person skilled in the art that a change of state may be performed through a change in pressure or temperature, and as such, the liquid $CO_2$ and $Ca(OH)_2$ mixture is not limited to being sent through throttle valve 132. Other apparatus or devices may be contemplated to aid in the change of state from the liquid $CO_2$ and $Ca(OH)_2$ mixture into dry ice.

The dry ice shell surrounding the $Ca(OH)_2$ particles are then fed into separator vessel 136. Pressure is maintained within separator vessel 136, allowing the $Ca(OH)_2$ particles to react with the dry ice shell, affecting the thickness of the $CaCO_3$ shell. The longer pressure is maintained, the thicker the $CaCO_3$ shell. The residence time of the $Ca(OH)_2$ particles and the dry ice within separator vessel 136 while pressure and temperature are maintained, correlates directly to the thickness of the $CaCO_3$ shell surrounding the $Ca(OH)_2$ particles. In a preferred embodiment, separator vessel 136 operates at 0.1 MPa, however separator vessel 136 may be maintained at a pressure range between 0.01 MPa to 0.518 MPa to thicken the $CaCO_3$ shell. In a preferred embodiment, separator vessel 136 may be maintained above $-78.5°$ C. Once the desired thickness of the $CaCO_3$ shell is achieved, the dry ice may be sublimated, producing gaseous $CO_2$. The dry ice may also be heated using a heating element, to further accelerate the sublimation process. This is depicted at block 225.

At block 230, the resulting calcium carbonate-coated calcium hydroxide product is collected. It will occur to the person skilled in the art that the size of the calcium carbonate-coated calcium hydroxide product may be controlled by the choice of the $Ca(OH)_2$ particle size that is fed into high-pressure reactor 124 through $Ca(OH)_2$ feed line 120.

Figure 3:
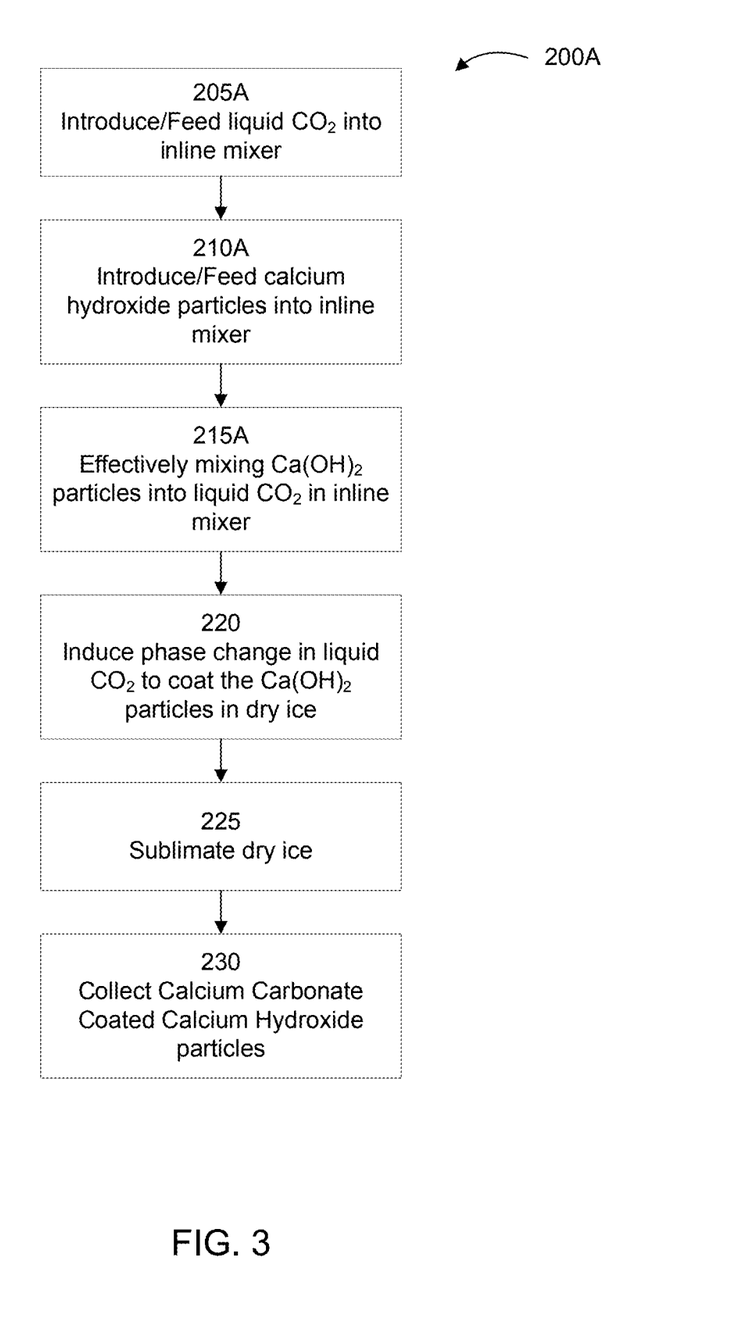
FIG. 3 depicts a method of producing calcium carbonate-coated calcium hydroxide particles in accordance with a second production line of the example system in FIG. 1.

FIG. 3 depicts method 200A for producing calcium carbonate-coated calcium hydroxide particles using second production line 160A. As previously mentioned, second production line 160A uses inline mixer 148 instead of high-pressure reactor 124. Liquid $CO_2$ is introduced into inline mixer 148 at block 205A and $Ca(OH)_2$ particles are fed into inline mixer 148 at block 210A. The liquid $CO_2$ and $Ca(OH)_2$ is then mixed/dispersed in inline mixer 148 at block 215A, before continuing through method 200. It will occur to the person skilled in the art that method 200 may be used with different embodiments of systems used to produce calcium carbonate-coated calcium hydroxide products.

Figure 5:
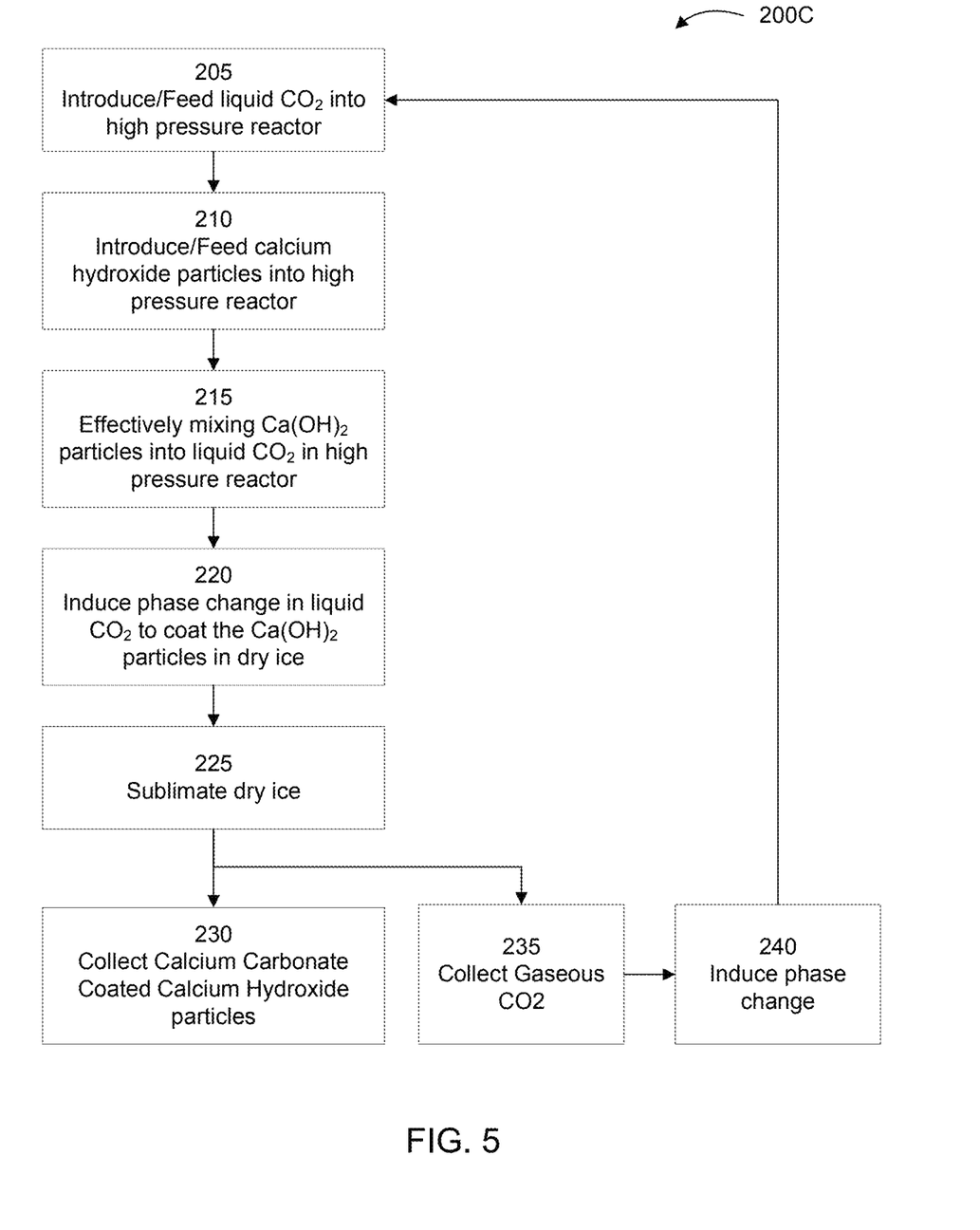
FIG. 5 depicts a method of producing calcium carbonate-coated calcium hydroxide particles in accordance with a first production line of the system shown in FIG. 4.

FIG. 5 depicts method 200C for producing calcium carbonate coated calcium hydroxide particles using first production line 160 and further taking the gaseous $CO_2$ product and cycling it back to be reused in first production line 160. Method 200C has similar steps to method 200, and blocks 205 to 230 follow the same process. Block 235 shows the collection of gaseous $CO_2$ from gaseous $CO_2$ port 140. Block 240 depicts in-line pressurization system 152 inducing a phase change on the gaseous $CO_2$, changing it to liquid $CO_2$. It will occur to a person skilled in the art that similar to block 220, the phase change may not be limited to be induced by a change in the pressure, but may also be a change in temperature, or a change in both temperature and pressure. FIG. 6 depicts the temperatures and pressures that liquid $CO_2$ may be obtained at.

Returning to FIG. 5, once liquid $CO_2$ has been obtained, it is then re-introduced into first production line 160 at storage tank 104, and is depicted by the line between block 240 and block 205. It will occur to a person skilled in the art that the recirculation of $CO_2$ may also be applied to method 200A in second production line 160A.

The size of the resultant calcium carbonate-coated calcium hydroxide product particle collected may be determined based on the $Ca(OH)_2$ particles fed into either high-pressure reactor 124 or inline mixer 148. The larger the $Ca(OH)_2$ particles fed into the system, the larger the resultant calcium carbonate coated calcium hydroxide product particles. Likewise, nanoparticle calcium carbonate-coated calcium hydroxide particles can be achieved by feeding nanosized $Ca(OH)_2$ reactant particles into the system.

A person skilled in the art will recognize that method 200 and method 200A may be performed with particles other than $Ca(OH)_2$ particles. Particles may be fed into high-pressure reactor 124 through a feed line in method 200, where the particles are mixed with liquid $CO_2$. Alternatively, particles may be fed into inline mixer 148 through a feed line in method 200A, where the particles are mixed with liquid $CO_2$.

In other embodiments, different methods may be used to coat calcium hydroxide particles with calcium carbonate. For example, in an alternative embodiment, liquid $CO_2$ may be flashed within a reactor by suddenly dropping the pressure within the reactor to below 0.518 MPa. Dry ice forms on $Ca(OH)_2$ particles that were previously fed into the reactor, where the $Ca(OH)_2$ particles act as heterogeneous nucleation sites for the formation of said dry ice. The dry ice around the $Ca(OH)_2$ particles reacts with the outer shell of the $Ca(OH)_2$ particles producing a shell of $CaCO_3$.

In a preferred embodiment, liquid $CO_2$ may be throttled to induce a phase change into an exit stream wherein it is mixed with $Ca(OH)_2$ particles and where, through heterogeneous nucleation, dry ice covered $Ca(OH)_2$ particles are created. These particles are then collected in a cyclone, where the remaining dry ice and the calcium carbonate ($CaCO_3$)-coated calcium hydroxide $Ca(OH)_2$ particles are separated and collected. An advantage of this embodiment is that throttling to induce a phase change to the liquid $CO_2$ is simple to implement leading to a system with low maintenance and less failure points. Another advantage of this embodiment, is that similar to method 200, the production time of this embodiment is significantly faster than that of existing production methods. In addition, similar to method 200, the resultant calcium carbonate-coated calcium hydroxide particles from this embodiment also have a higher biocidal activity in comparison to those in the previously cited Vance et al. (2015) 'Direct Carbonation of $Ca(OH)(_2)$ Using Liquid and Supercritical $CO_2$: Implications for Carbon-Neutral Cementation', leading to an increased number of uses, especially in environments where a biocidal effect is advantageous.

An exemplary system for implementing this preferred method is depicted in FIG. 8, where a liquid $CO_2$ storage tank 104 may feed liquid $CO_2$ into thermally insulated hose 804 through gate valve 112. Both gate valve 112 and flow meter 808 may control the flow rate of liquid $CO_2$ into thermally insulated hose 804. The thermally insulated hose 804 is connected to expansion nozzle 816 (also referred to herein as a throttle 816 or a throttle valve 816), where liquid $CO_2$ may be throttled and so as to induce a phase change from liquid to a mix of solid and gaseous states. The resulting mixture of solid and gaseous $CO_2$ is propelled through exit stream 828, where $Ca(OH)_2$ particles are added via screw feeder 824. Through heterogeneous nucleation, dry ice-covered $Ca(OH)_2$ particles are created, which are then introduced into cyclone 832 where sublimation occurs. Any remaining/excess $CO_2$ and $CO_2$ from the sublimation may be collected though gaseous $CO_2$ outlet 140, and returned to liquid $CO_2$ storage tank 104 after going through a phase change from gaseous state to liquid state through in-line pressurization system 152. The produced calcium carbonate coated hydroxide particles are collected via the connected calcium carbonate-coated calcium hydroxide product particle outlet 144.

As previously indicated flow meter 808 and gate valve 112 control the rate at which liquid $CO_2$ is introduced into thermally insulated hose 804. The flow rate of the liquid $CO_2$ entering throttle 816 is proportional to the kinetic energy of exit stream 828, where a high kinetic energy of exit stream 828 may be achieved due to the initial flow rate of the liquid $CO_2$ and the pressure differential between the entrance of throttle 816 and the exit of throttle 816 where exit stream 828 begins. A high kinetic energy of exit stream 828 allows for the suspension of solid dry ice and also $Ca(OH)_2$ particles. In a preferred embodiment, the flow rate of the liquid $CO_2$ in thermally insulated hose 804 and upon entering throttle 816 is approximately 173.5 kg/d. The speed of the mixture of solid and gaseous $CO_2$ propelled through exit stream 828 measured in proximity to the exit of throttle 816 may range between 6 m/s to 600 m/s. In a preferred embodiment, the speed of the mixture of solid and gaseous $CO_2$ in exit stream 828 measured in proximity to the exit of throttle 816 may be 60 m/s.

In the current embodiment, thermally insulated hose 804 allows for the flow of liquid $CO_2$ from liquid $CO_2$ storage tank 104 to throttle valve 816. Thermally insulated hose 804 also ensures that the liquid $CO_2$ that is flowing through is kept at a pressure range of 0.518 MPa to 16 MPa and a temperature range of $-56.56°$ C. to $30.98°$ C. at position 812 prior to liquid $CO_2$ entering throttle valve 816. Furthermore, thermally insulated hose 804 may provide additional distance for liquid $CO_2$ to reach a specific flow rate. However, if the liquid $CO_2$ is kept at said pressure range and temperature range within liquid $CO_2$ storage tank 104, and the liquid $CO_2$ may be discharged as a specific flow rate, insulated hose 804 may be optional. In alternate embodiments, liquid $CO_2$ from liquid $CO_2$ storage tank 104 may be introduced directly into throttle 816, where flow meter 808 and gate valve 112 control the rate at which liquid $CO_2$ is introduced into throttle 816.

Between position 812 and position 820, liquid $CO_2$ is throttled through throttle valve 816 and undergoes a phase change from liquid to a mixture of gas and solid. More specifically, the liquid $CO_2$ is changed into a mixture of gaseous $CO_2$ and solid dry ice. Undergoing a phase change using throttle 816 is advantageous due its simplicity. The throttling occurs at approximately constant enthalpy, also known as an isenthalpic process, per energy balance on throttle valve 816. The phase change is induced through a change of pressure or a change of temperature, which can be determined through FIG. 7. In the current embodiment, at position 820, the pressure is below 0.518 MPa. A person skilled in the art will recognize the different configurations and variables, such as temperature and pressure, of inducing phase change from the liquid $CO_2$ to a mixture of gaseous $CO_2$ and solid dry ice.

As the mixture of gaseous $CO_2$ and solid dry ice leave throttle valve 816, the mixture enters exit stream 828. Exit stream 828 has high kinetic energy due to throttle valve 816 and also the initial kinetic energy from liquid $CO_2$ enter thermally insulated hose 804 from liquid $CO_2$ storage 104. The high kinetic energy allows the particles of $Ca(OH)_2$ introduced from screw feeder 824 to be suspended as they flow along exit stream 828. Exit stream 828 may be encompassed by an insulated hose, pipe or any form of physical structure that will not impede the high kinetic energy of exit stream 828, while being able to maintain the temperature and pressure as required in exit stream 828, and direct the flow of exit stream 828 towards cyclone 832. Screw feeder 824 is used for the introduction of $Ca(OH)_2$ particles to ensure a steady and regular flow of $Ca(OH)_2$ particles into exit stream 828. In a preferred embodiment, screw feeder 824 is in proximity to the exit of throttle valve 816 and the beginning of exit stream 828, where kinetic energy is at its highest after exiting throttle valve 816, and also allowing time within exit stream 828 for heterogeneous nucleation, which will be further discussed below. Other forms of feeder or introducing $Ca(OH)_2$ particles may be contemplated, as long as the introduction of the $Ca(OH)_2$ particles are done in a regular and controlled manner.

As the $Ca(OH)_2$ is introduced via screw feeder 824 into exit stream 828, the $Ca(OH)_2$ particles act as heterogeneous nucleation sites for the dry ice. The dry ice forms around the $Ca(OH)_2$ particles and reacts with the outer shell of the $Ca(OH)_2$ particles producing a shell of $CaCO_3$. Due to the high kinetic energy, the $Ca(OH)_2$ particles are suspended in the gas in exit stream 828, allowing the $Ca(OH)_2$ particles to act as a core and exposing the entire surface of the $Ca(OH)_2$ particles, allowing for a uniform coating of dry ice. As the $Ca(OH)_2$ particles and the mixture of gaseous $CO_2$ and solid dry ice travel through exit stream 828, and as heterogeneous nucleation occurs around the $Ca(OH)_2$ particles, sublimation may also occur, where any excess dry ice in the exit stream 828 that does not undergo heterogeneous nucleation around the $Ca(OH)_2$ particles, and any excess dry ice that has grown as a result of heterogeneous nucleation around the $Ca(OH)_2$ particles may undergo a phase change into gaseous $CO_2$. Similarly, $Ca(OH)_2$ particles that undergo heterogeneous nucleation early on after entering exit stream 828 from screw feeder 824 may begin reacting and becoming dry ice coated core-shell calcium hydroxide-calcium carbonate (CSCC) particles. In addition, changes in temperature and pressure within exit stream 828 may cause gaseous $CO_2$ to become dry ice as it travels through exit stream 828. Furthermore, while the high kinetic energy promotes heterogeneous nucleation of the $Ca(OH)_2$, there may still be a minority of $Ca(OH)_2$ particles that remain uncoated. As such, the resulting mixture introduced into cyclone 832 may include gaseous $CO_2$, solid dry ice, $Ca(OH)_2$ particles, dry ice covered $Ca(OH)_2$ particles, and dry ice covered CSCC particles.

As said mixture enters and spirals within cyclone 832, sublimation continues to occur, where any excess dry ice, whether coated on the $Ca(OH)_2$ particles or excess dry ice from the phase change from throttle valve 816 that was introduced into cyclone 832 from exit stream 828 may undergo a phase change into gaseous $CO_2$. In addition, uncoated $Ca(OH)_2$ particles may undergo heterogeneous nucleation within cyclone 832 if heterogeneous nucleation did not occur within exit stream 828. Furthermore, the $Ca(OH)_2$ particles coated in dry ice continue to react to create dry ice covered CSCC particles. The mixture in cyclone 832 may also undergo an increase in temperature and a pressure drop while in cyclone 832. The increase in temperature may be due to a lack of insulation surrounding cyclone 832, or it may be due to the addition of heating elements to increase the speed of sublimation. The pressure drop arises due to the shape and design of cyclone 832. Similar to method 200, the residence time of the dry ice coated CSCC particles while undergoing sublimation will affect the thickness of the calcium carbonate coating on the calcium hydroxide particles. The residence time of the dry ice coated CSCC particles in cyclone 832 may be affected by various factors, including the shape and design of cyclone 832.

Cyclone 832 further separates gaseous $CO_2$ from the $CaCO_3$-coated $Ca(OH)_2$ particles through cyclonic separation and/or centrifugal force, where due to the weight of the particles or as a result of the $CaCO_3$ particles losing momentum when colliding against the wall of cyclone 832, the $CaCO_3$-coated $Ca(OH)_2$ particles settle at the bottom of cyclone 832 due to gravity and are collected at the bottom of cyclone 832, at calcium carbonate-coated calcium hydroxide product particle outlet 144. In the current embodiment, collector 836 collects the $CaCO_3$-coated $Ca(OH)_2$ particle product, however as will be evident, collector 836 is optional, and if present, may be of any shape or size for the collection of the $CaCO_3$-coated $Ca(OH)_2$ particle product.

Gaseous $CO_2$ is collected at the top of cyclone 832 at gaseous $CO_2$ outlet 140, due to the spinning effect of cyclone 832. Similar to embodiment of system 100C, the gaseous $CO_2$ that is collected at gaseous $CO_2$ outlet 140 may be returned to storage tank 104 via return line 156, after going through in-line pressurization system 152. As previously discussed, in-line pressurization system 152 raises the pressure within return line 156 to induce a phase change on the $CO_2$, converting the gaseous $CO_2$ into liquid $CO_2$.

In alternative embodiments, cyclone 832 may be replaced with electrostatic precipitators or separator vessel 136 to allow for sublimation of dry ice and the separation of dry ice covered CSCC particles from the remaining mixture. A person skilled in the art will recognize that different equipment may be used to allow for sublimation of dry ice and the separation of dry ice covered CSCC particles from gaseous $CO_2$ and other mixture components.

Figure 9:
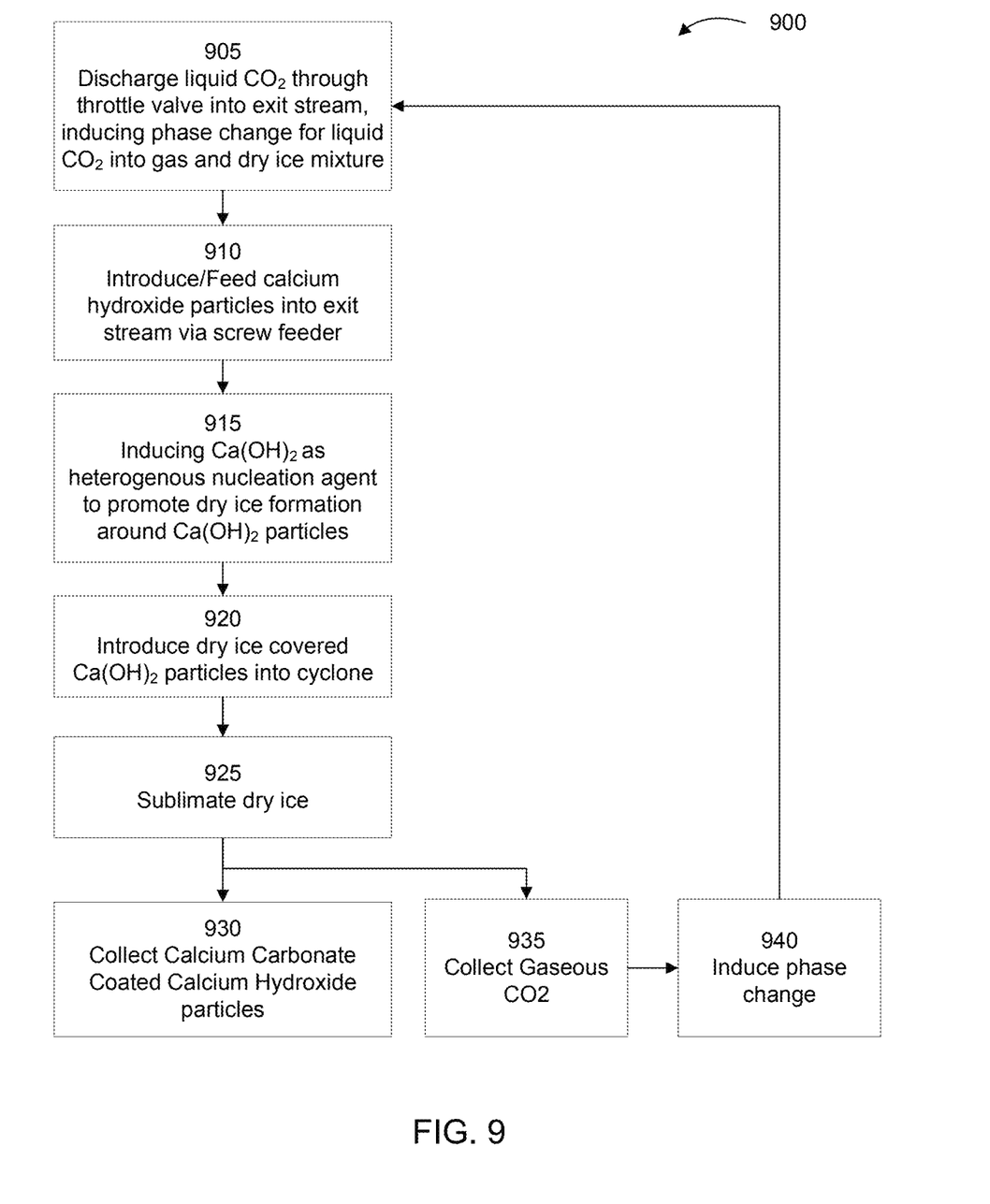
FIG. 9 depicts a method of producing calcium carbonate-coated calcium hydroxide particles in accordance with the example system in FIG. 8.

Referring to FIG. 9, method 900 is depicted for producing calcium carbonate coated calcium hydroxide particles using system 800. At block 905, liquid $CO_2$ is discharged from liquid $CO_2$ storage tank 104 through gate valve 112, thermally insulated hose 804, and throttle valve 816 into exit stream 828, where the liquid $CO_2$ undergoes a phase change as it is throttled through throttle valve 816 from liquid $CO_2$ into a mixture of gaseous $CO_2$ and solid dry ice.

As the mixture of gaseous $CO_2$ and solid dry ice travels through exit stream 828, screw feeder 824 introduces $Ca(OH)_2$ particles at a regular and controlled rate into exit stream 828, where it joins the mixture of gaseous $CO_2$ and solid dry ice. This is depicted at block 910.

At block 915, as the $Ca(OH)_2$ particles travel through exit stream 828, the $Ca(OH)_2$ particles act as heterogeneous nucleation sites for dry ice. As previously discussed, due to the high kinetic energy of exit stream 828, the $Ca(OH)_2$ particles are suspended in the air, allowing the exposure of the surface of the $Ca(OH)_2$ particles for the build-up and formation of dry ice around the $Ca(OH)_2$ particles. Once covered with dry ice, particle agglomeration of the dry ice covered $Ca(OH)_2$ particles is limited.

At block 920, the dry ice covered $Ca(OH)_2$ particles are introduced into cyclone 832 for cyclonic separation. While being exposed to the rotational effects within cyclone 832, the dry ice covered $Ca(OH)_2$ particles and the excess solid dry ice from exit stream 828 that did not form around the $Ca(OH)_2$ particles are sublimated, changing the phase of the dry ice into gaseous $CO_2$. This is depicted at block 925.

Through cyclonic separation, the gaseous $CO_2$ and the calcium carbonate coated calcium hydroxide particles are separated, with the gaseous $CO_2$ discharged through the top of cyclone 832 through gaseous $CO_2$ outlet 140 (as depicted at block 935), and the calcium carbonate coated calcium hydroxide particles falling to the bottom of cyclone 832 and collected through calcium carbonate coated calcium hydroxide particle outlet 144 (as depicted at block 930).

In certain embodiments, the collected gaseous $CO_2$ may be optionally recycled by inducing a phase change from gaseous $CO_2$ to liquid $CO_2$ as depicted at block 940, where the liquid $CO_2$ may be returned to liquid $CO_2$ storage tank 104 to be discharged again at block 905.

Although the foregoing description and accompanying drawings relate to specific preferred embodiments of the present invention as presently contemplated by the inventor, it will be understood that various changes, modifications and adaptations, may be made without departing from the spirit of the invention.

The embodiments for which an exclusive privilege or property is claimed are as follows:

1. A method of preparing calcium carbonate ($CaCO_3$)-coated calcium hydroxide ($Ca(OH)_2$) particles comprising:
    introducing liquid carbon dioxide into a reaction vessel without inducing a phase change in the liquid carbon dioxide;
    feeding calcium hydroxide particles into an auxiliary chamber;
    flushing the calcium hydroxide particles in the auxiliary chamber with the liquid carbon dioxide to form a mixture;
    introducing the mixture into the reaction vessel to be further mixed with the already present liquid carbon dioxide;
    inducing a phase change in the liquid carbon dioxide so as to coat the calcium hydroxide particles in dry ice; and
    sublimating the dry ice after a predetermined residence time to control the thickness of the calcium carbonate coating on the calcium hydroxide particles.

2. The method of claim 1, wherein the liquid carbon dioxide introduced into the reaction vessel is at a pressure of 8 MPa and a temperature of −25° C.

3. The method of claim 1, wherein the liquid carbon dioxide is introduced into the reaction vessel at a pressure range of 0.518 MPa to 16 MPa and a temperature range of −56.56° C. to 30.98° C.

4. The method of claim 1, wherein the reaction vessel is a high-pressure reactor, the high-pressure reactor further comprising a stirrer for mixing.

5. The method of claim 1, wherein the reaction vessel is an inline mixer.

6. The method of claim 1, wherein inducing the phase change in the liquid carbon dioxide is performed using a throttle valve to flash the liquid carbon dioxide into dry ice.

7. The method of claim 6 wherein the throttle valve flashes at an exit pressure of 0.1 MPa.

8. The method of claim 6, wherein the throttle valve flashes at an exit pressure range of 0.01 MPa to 0.518 MPa and a temperature lower than −56.56° C.

9. The method of claim 1, wherein controlling the thickness of the calcium carbonate coating on the calcium hydroxide particles occurs over the predetermined residence time in a separator vessel at a pressure of less than or equal to 0.518 MPa.

10. The method of claim 1, further comprising:
    collecting gaseous carbon dioxide from the sublimation of the dry ice; and
    inducing a phase change in the gaseous carbon dioxide to provide liquid carbon dioxide to be introduced into the reaction vessel.

* * * * *